(12) United States Patent
Kujat (10) Patent No.: US 9,938,046 B2
(45) Date of Patent: Apr. 10, 2018

(54) SHEET-MATERIAL PACKAGING BAG (75) Inventor: Marcus Kujat, Osnabrueck (DE)

(73) Assignee: NORDENIA DEUTSCHLAND HALLE GMBH, Halle (DE)

(*) Notice: Subject to any disclaimer, the term of this patent is extended or adjusted under 35 U.S.C. 154(b) by 2180 days.

(21) Appl. No.: 12/602,225

(22) PCT Filed: May 31, 2007

(86) PCT No.: PCT/EP2007/004823
§ 371 (c)(1),
(2), (4) Date: Sep. 28, 2010

(87) PCT Pub. No.: WO2008/145164
PCT Pub. Date: Dec. 4, 2008

(65) Prior Publication Data
US 2011/0033133 A1 Feb. 10, 2011

(51) Int. Cl.
B65D 30/20 (2006.01)
B65D 33/06 (2006.01)
(Continued)

(52) U.S. Cl.
CPC ............ B65D 31/10 (2013.01); B65D 33/06 (2013.01); B65D 33/20 (2013.01); B65D 33/2508 (2013.01); B65D 33/2533 (2013.01); B65D 75/5816 (2013.01); B65D 75/5866 (2013.01); B65D 2313/02 (2013.01); B65D 2575/586 (2013.01)

(58) Field of Classification Search
USPC ............ 383/12, 17, 20, 120, 200, 203, 204, 383/207–209, 61.2, 63, 64, 65, 6, 7, 10, 383/14, 25, 26, 28; 229/215, 216, 219, 229/248, 125.06, 125.42, 117.09, 117.16, 229/117.17, 117.23; 220/752, 754, 761, 220/770, 771
See application file for complete search history.

(56) References Cited

U.S. PATENT DOCUMENTS 3,208,492 A * 9/1965 Braithwaite ............... 383/8
3,642,189 A 2/1972 Widenback ............... 299/7
(Continued)

FOREIGN PATENT DOCUMENTS

DE 4037456 5/1992
DE 2015181 2/2002
EP 1777167 4/2007

*Primary Examiner* — Nathan J Newhouse
*Assistant Examiner* — Nina Attel
(74) *Attorney, Agent, or Firm* — Andrew Wilford (57) ABSTRACT The invention relates to a sheet-material packaging bag which has a first side gusset (3) and a second side gusset (4), which are positioned between a front surface (1) and a rear surface (2), a top sealing seam (6) and at least one longitudinal sealing seam (5), wherein a reclosure device is arranged on the inner bag surface, beneath the top sealing seam (6), in the region of the first side gusset (3), and wherein the first side gusset (3) forms a reclosable pouring means when a bag portion (8) above the reclosure device is opened in order for contents to be removed. According to the invention, a carrying handle (14) is arranged on the second side gusset (4) and, as seen in the longitudinal direction of the second side gusset (4), is provided in the center or in an off-center manner in relation to the base (15) of the sheet-material packaging bag.

14 Claims, 6 Drawing Sheets

(51) Int. Cl.
*B65D 33/38* (2006.01)
*B65D 33/25* (2006.01)
*B65D 33/20* (2006.01)
*B65D 75/58* (2006.01)

(56) References Cited

U.S. PATENT DOCUMENTS

| | | | | |
|---|---|---|---|---|
| 3,873,735 | A * | 3/1975 | Chalin et al. | 426/87 |
| 4,905,888 | A * | 3/1990 | Suoss et al. | 229/117.22 |
| 5,169,696 | A * | 12/1992 | Lang et al. | 428/35.2 |
| 5,186,542 | A * | 2/1993 | Seabold | 383/25 |
| 5,547,284 | A * | 8/1996 | Imer | 383/104 |
| 5,716,473 | A | 2/1998 | Gordon | 156/200 |
| 5,874,155 | A * | 2/1999 | Gehrke et al. | 428/134 |
| 6,352,365 | B1 * | 3/2002 | Healy et al. | 383/209 |
| 6,598,784 | B2 * | 7/2003 | LaBras et al. | 229/117.22 |
| 6,820,391 | B2 * | 11/2004 | Barmore et al. | 53/133.4 |
| 2005/0061704 | A1 * | 3/2005 | Cole et al. | 206/524.7 |
| 2006/0021296 | A1 | 2/2006 | Yeager | 53/412 |
| 2006/0108375 | A1 | 5/2006 | Pritchard | 222/107 |
| 2006/0188178 | A1 | 8/2006 | Haimerl | 383/14 |
| 2007/0086683 | A1 * | 4/2007 | Yeager | 383/95 |
| 2008/0010945 | A1 * | 1/2008 | McKenna et al. | 53/134.1 |
| 2008/0135428 | A1 * | 6/2008 | Tallier | 206/264 |
| 2008/0233252 | A1 * | 9/2008 | Manning et al. | 426/412 |

* cited by examiner

SHEET-MATERIAL PACKAGING BAG

CROSS REFERENCE TO RELATED APPLICATIONS

This application is the US-national stage of PCT application PCT/EP2007/004823, filed 31 May 2007, published 4 Dec. 2008 as WO2008/145164, and claiming the priority of PCT patent application PCT/EP2007/004823 itself filed 31 May 2007, whose entire disclosures are herewith incorporated by reference.

FIELD OF THE INVENTION

The invention relates to a film packaging bag that has a first side gusset and a second side gusset between a front panel and a back panel, a top weld seam and at least one longitudinal weld seam, a reclosable fastener being located in the inner bag surfaces underneath the top weld seam near the first side gusset with the first side gusset forming a reclosable pour spout when the closure opens the bag above the first gusset to remove contents.

BACKGROUND OF THE INVENTION

The film packaging bag with the described design is suitable for packaging bulk materials, for example dry food for animals, and has a reclosable fastener that makes it possible for the contents of the package to be partially poured or taken out. In addition to pelletized animal feed, packaged goods such as, for example, detergents, cat litter, road salt and powdery or grainy construction materials come into consideration. After opening the film packaging bag at a part of the bag above the reclosable fastener, contamination of the contents can be prevented by the reclosable fastener that also ensures protection against moisture and, in the case of food items and animal feed, also provides a certain preservation of aroma. The removal of contents takes place through an opening in the first side gusset, to which end the side gusset can be pulled out after opening the reclosable fastener and be used as a pour spout. The opening can be closed. The reclosable fastener can be designed as a so-called zipper having strip-like slot and tongue elements that can be connected manually as a result of pressure forming a snap connection or clip connection. Other reclosable closures are also conceivable, for example, Velcro® strip fasteners or reclosable fasteners with a self-adhesive strip.

A film packaging bag with the characteristics described above is known from publication WO 2004/092025 [US 2006/0021296]. It consists of a film that is folded into a tube. The tube created by folds has side gussets that are folded in and is closed on each end by a longitudinal weld seam and at its top end by a top weld seam. Underneath the top weld seam, a closure is located at the first side gusset, which is formed by a continuous strip fastener. The W-shaped folded strip fastener is located at the first side gusset and not welded with itself. The strip fastener is longer than the width of the side gusset and is secured to the inner face of the side gusset, as well as at the adjacent bag surfaces, which form the front panel and back panel of the film packaging bag. For the first use, a bag region above the reclosable fastener that is located at the inner surface of the bag is ripped open along a tear line. For removing packaged materials, the first side gusset is then pulled out in the area of the reclosable fastener, whereby a reclosable pour spout is formed. For closure of the film packaging bag, the upper region of the first side gusset remains in pulled out condition, whereby the strip fastener then extends U-shaped.

From publication DE 203 11 386 [US 2006/0188178], a film packaging bag is known with a carry handle formed by a strip of film. The strip of film is located in an upper half of the film packaging bag and connected with its two ends with a panel of the bag. The film packaging bag can also be designed as side gusset bag with a front panel, a back panel and two side gussets, whereby then at the upper edge of the bag a closure is provided and whereby the strip of film is located close to the closure at the upper edge of the receptacle.

OBJECT OF THE INVENTION

The invention is based on the problem of further developing a film packaging bag with the characteristics described above in such a way that it is easier to handle. Particularly, for large and also for heavy and/or large film packaging bags, a precise dosing of individual portions is to be made possible when pouring out the contents.

SUMMARY OF THE INVENTION

Starting with a film packaging bag with the characteristics described above, the problem is solved thereby, that a carry handle is located at the second side gusset that is located offset longitudinally of the second side gusset in the center or off-center with respect to the bottom of the film packaging bag. Prior to the first opening, the film packaging bag can be transported particularly easily using the carry handle. In accordance with the invention, the pour spout for one and the carry handle for another are located at opposite side gussets of the film packaging bag. After the first opening of the bag and a pulling out of the pour spout that is formed by the first side gusset, the bag that is held by the carry handle can be tipped with little exertion of force, whereby also without any particular skill, precise portioning of the bulk material that is poured out is possible. As the result of the location of the carry handle extending along the longitudinal direction of the second side gusset, the resting position of the film packaging bag held by the carry handle can be varied. If the carry handle is located, for example, in the longitudinal center of the second side gusset when the film packaging bag is completely full, the first and the second side gusset extend approximately horizontal in the resting position. When the carry handle is displaced to the top end of the bag, in relation to a location in the center, the pour spout is raised and in a displacement of the carry handle in the direction of the bottom of the film packaging bag, the pour spout is lowered in the resting position. Although when the carry handle is located in the center, the film packaging bags can be carried particularly comfortably, an off-center location of the carry handle offset toward the bottom of the film bag allows a complete emptying of the film packaging bag in a particularly easy manner. The carry handle advantageously extends longitudinally of the second side gusset.

Within the scope of the invention, the front panel, the back surface and the two side gussets can be made available respectively as a separate piece of film and assembled for the formation of the material sheet packaging bag. In a preferred embodiment of the invention it is provided, however, that the front panel, the back panel and the side gussets are formed by folds of an at least two-layer film for bags, whereby the film for the bag is preferably provided at inside the bag with a layer of weldable plastic and on the outside, preferably with a layer of a nonweldable material. The inner surface of the film for bags can, for example, be made of a polyolefin that can be welded easily.

For example, composite films are suitable as films for bags with an outer surface of polyethylene terephthalate (PET) and an inner surface of polyethylene (PE). Between the inner surface and the outer surface, additional film layers can be located without any limitation in order to increase the stability and/or the barrier effect. In order to achieve a particularly good barrier effect with respect to various gases, moisture and aromas, a thin metal layer can be provided, for example. Even composite materials with layers of various polymers can be used within the scope of the invention, whereby preferably the polymer composition of the inner surface is constituted in such a way that at a suitable sealing temperature, only the inner surface melts. Suitable are, for example, composite materials of co-extruded polyethylenes or multi-layered film panels of high density polyethylene (HDPE). Films of this type distinguish themselves by a high tensile, tear and puncture strength. In accordance with the invention, the entire film bag can also be made of polyethylene and can therefore be recycled easily.

The film layer that lies at the outer surface is typically printed at its outside or inside. For print on the inside, such is applied prior to a lamination of the outer layer with at least one additional inner layer and in the completed film packaging bag it is protected against abrasion by its location on the inside. For print on the outside, an optional thin layer of a protective lacquer can be provided to protect the print image. As the reclosable fastener is located inside the bag at the first side gusset and the carry handle is located at the second side gusset, the optical impression and the print images on the front and rear wall of the packaging bag are not impaired by the handling devices that were mentioned.

Various preferred designs result for the carry handle within the scope of the present invention. Within the scope of a first preferred embodiment of the carry handle, such is glued onto the outer surface of the second side gusset as a separate strip of film or, if the outer surface of the second side gusset can be welded hot, it is welded on. Within the scope of this design, attaching the carry handle takes place in a particularly easy manner, whereby even the leak-tightness of the film packaging bag is not limited in the region of the carry handle.

Within the scope of the second embodiment of the carry handle, the second side gusset is provided with two slits, whereby the carry handle is formed at least by the region of the side gusset that is bordered at the edges by the slits and whereby the region of the carry handle is covered at the inner bag surface by at least one covering piece of film. The region of the side gusset thereby forms a handle loop that is integrated into the outer surface of the film packaging bag, whereby the opening formed by the slits are covered by a covering piece of film at the inner surface of the bag. Within the scope of this embodiment, the handle loop is formed by the second side gusset itself, for which reason an expensive inlet and precise positioning of a strip of film that forms the handle loop is not required.

The slits that border the handle loop at the edges can be created particularly easily in the manufacture of the film packaging bag by punching, cutting or a similar process. For example, the covering piece of film can be connected with the inner surface of the film by hot sealing, whereby for a tight lock preferably a closed weld seam is provided that surrounds it at the edge.

In an embodiment of the invention that can be made particularly easily, the slits can be designed as straight parallel lines, whereby, however, without limitation, for example, for optimization of the bearing load, an arcuate shape can be provided. Within the scope of a preferred further embodiment of the described design of the carry handle, in the region of the handle loop, an reinforcement sheet is secured to the inner surface of the bag, the handle loop being formed by the part of the bag film that is flanked by the slits and the reinforcement sheet. As a result of the reinforcement sheet that is preferably fastened on the inner surface of the second side gusset by hot sealing, the load capacity of the handle loop can be increased, so that even heavy film packaging bags can be transported safely. A particularly high load-bearing capacity can be achieved when the slits are each located between two respective weld seams with which the reinforcement sheet is welded onto the inner surface of the second side gusset. In order to ensure a particularly leak-proof mounting, the covering piece of film preferably completely covers the reinforcement sheet and the reinforcement sheet is surrounded by a circumferential closed weld seam between the covering piece of film and the inner surface of the bag.

Within the scope of a further alternative embodiment, the carry handle is formed by a separate strip of film that is fastened directly or above a carrier sheet at the inner surface of the second side gusset and that is accessible through an opening in the second side gusset during use, the region of the carry handle being covered at the inner bag surface by at least one covering piece of film.

For example, the ends of the strip of film can be fastened on the inner surface of the second side gusset by adhesion or hot sealing, a central handle portion of the strip of film being accessible through the opening in the second side gusset. It is within the scope of a preferred further embodiment, however, that the strip of film is attached at an inner surface of the bag to a carrier sheet that is wider than the strip of film, the strip of film being provided with a handle portion in the longitudinal center between two strip ends that are folded around the carrier sheet and the carrier sheet being connected indirectly or directly with the inner surface of the bag laterally of the strip of film. Within the scope of such an embodiment, the strip of film is not connected directly with the film of the bag but to the carrier sheet so that, when the film packaging bag is carried, the force that acts upon the carry handle is first distributed to the carrier sheet and thus to a large surface to the sides of the strip of film. As a result of the more even distribution of force, the bearing load that can be carried can be significantly increased compared to known embodiments by using the same films for the film of the bag and the strip of films.

In order to achieve a particularly high load capacity of the carry handle, preferably, the strip ends that are folded over overlap partially and where they overlap, for example as the result of hot welding, they are connected so that the strip of film forms a closed loop. This way, the strip ends can optionally also be affixed directly to the carrier sheet by hot sealing or adhesion. Beyond that, it is also within the scope of the invention that the strip ends are not connected directly with each other but only with the carrier sheet.

The carrier sheet and the strip of film are covered inside the bag by at least one piece of cover film. The piece of cover film is for leak-proof sealing of the bag in the region of the carry handle, at least the folding points of the strip of film being covered by a continuous piece of cover film or by two pieces of cover film.

In order to be able to grasp the handle portion at the outer surface of the bag, the film of the bag can be provided with cuts or an opening in the form of a cut-out that extend to the side of the handle portion and through which the handle portion is accessible. Further, in the region of the carry handle, a tear line or a perforation can be provided so that the handle portion can be released by separation at the tear line or the perforation. The tear line or perforation is preferably closed so that the piece of film that is bordered by the tear line or perforation can be completely separated from the film that forms the second side gusset. The piece of film can thereby be connected with the handle portion by hot sealing and/or adhesive, the piece of film that is separated out then remaining on the handle portion after opening and not having to be disposed of as a separate piece. The second side gusset, the strip of film, the carrier sheet and the locking sheet are preferably connected with each other by hot sealing. In principle, however, gluing or a combination of gluing and hot sealing is also possible. In order to achieve a particularly high bearing capacity of the carrying strip, it can be designed, for example, in the form of two layers that are folded on top of each other and welded with each other.

Prior to the first opening of the film packaging bag, the closure progresses W-shaped at the first side gusset and the bordering regions of the front panel and the back panel. In order to open the film packaging bag for the first time, the weld seam can be designed in the region of the first fold in such a way that it can be separated easily. Preferably, however, a tear line is provided above the closure, so that an end region of the film packaging bag can be torn off to give access the closure. For removing contents, the reclosable pour spout that is formed by the first side gusset is folded outward, whereby, depending on the design of the reclosable fastener, it can also be closed when it is folded out. In a preferred embodiment, however, the pour spout, which is formed by the first side gusset to make the reclosing possible, can be folded in between the front panel and the back panel, and within the scope of such a design, typically, the reclosable fastener removably connects the first side gusset with the adjacent front panel and the back panel. Within the scope of such a design, the outer edges between the first side surface and the adjacent front or back panels are preferably designed as folds that are stiffened by longitudinal weld seams and that extend up to the top weld seam. This way, the weld seams not only stiffen the film packaging bag, but in relation to the first side gusset, they create the preferred W-shaped arrangement of the reclosable fastener when the first side gusset is folded in. In order to further strengthen the film packaging bag and to also ensure good leak-tightness even after first opening, a weld seam adjacent the reclosable fastener connects the front panel and back panel of the film packaging bag and extends up to the top weld seam or up to the second side gusset. The additional weld seam thus borders the reclosable pour spout.

Preferably, a tear line is provided above the reclosable fastener and consists of a combination of an embossed line formed by hot sealing and a laser seam that is applied to the outer layer of the composite film and overlays the embossed line. As a result of the hot sealing, the film is deformed under the effect of pressure and temperature and, in the laser process, a partial material abrasion takes place on the outer surface of the film in the region of the embossed line. The combination of a laser seam and a hot-weldable embossed line results in a tear line that distinguishes itself by having very good tearing behavior. The tearing is easy and takes place with defined progression along the tear line. Because the laser abrasion is limited to the outer layer of the film, the tear line remains air tight. The permeation of oxygen and hydrogen through the region of the line of oscillation is negligible. Where the tear line reaches the folds that are reinforced by the longitudinal weld seams, notches are advantageously provided in the longitudinal weld seams for starting a tear.

The tear line can extend parallel to the reclosable fastener and a horizontal weld seam that is connected to it, and across the top of the filling space, over the entire width of the film of the bag up to the edges of the second side gusset. But it is also within the scope of the invention that the tear line extends parallel to the reclosable fastener and then veers off upward or at an angle toward the top weld seam.

The reclosable fastener is preferably formed by a zipper and has an attachment lip that can be secured to the inner surface of the bag and locking strips formed on the attachment lip. The locking strips can be snapped into each other by a type of slot and tongue connection upon the application of pressure, whereby within the scope of the invention, reclosable locking strips or male reclosable strips with at least one projection and respective female strip fasteners with at least one seat for the projection can be provided. The attachment lip is advantageously connected by two weld seams flanking the locking strips with the film that forms the film packaging bag. In addition to reclosable fasteners that can be shut manually, however, different types of reclosable fasteners such as, for example, self-adhesive strip fasteners or Velcro® fasteners are also suitable within the scope of the invention.

Several possibilities result with respect to mounting the reclosable fastener. A preferred embodiment of the invention provides that the length of the reclosable fastener is greater than the width of the first side gusset, a center portion of the reclosable fastener being secured to the inner surface of the side gusset and on both sides to end portions of the reclosable fastener are connected with the inner surface of the front panel or the back panel of the bag. But it is also within the scope of the invention that at the inner surface of the first side surface, a first strip fastener is located that extends to the outer edges of the bag and works together with strips that are affixed to the front panel and the back panel. Suitable profiles of the strip fasteners are described, for example, in DE 201 15 181.

According to an advantageous design of the invention, all four outer edges of the film bag are stiffened by longitudinal weld seams. When the film packaging bag is formed by folding the film for a bag, the longitudinal weld seam that closes the film packaging bag at the shell side can extend without limitation along the front panel or the back panel or can be integrated into an edge that borders one of the side gussets. Within the scope of such an embodiment, the film packaging bag can, for example, connect the longitudinal weld seam that closes on the shell side with the second side gusset of the front panel or the back panel of the bag.

BRIEF DESCRIPTION OF THE DRAWING

In the following, the invention is explained with reference to drawing showing only one embodiment. Therein.

DETAILED DESCRIPTION

The film packaging bag shown in the figures is formed by folding a film for bags and is provided with a front panel 1, a back panel 2, a folded-in first side gusset 3, and a folded-in second side gusset 4. The film packaging bag is closed by a longitudinal weld seam 5, a top weld seam 6, and a bottom weld seam that is not shown. A strip fastener 7 forming a reclosable fastener is fastened to inner surfaces of the bag below the top weld seam and connects the first side gusset 3 with the adjacent front panel 1 and back panel 2 of the bag, this reclosable fastener being closed prior to first opening the film packaging bag. To remove contents, a part 8 of the bag is ripped off above the strip fastener 7 along a tear line 9 in the film of the bag. After that, the first side gusset 3 forms a reclosable pour spout that can be folded out. It becomes clear when comparing FIGS. 1 to 3 that folds 10 between the first side gusset 3 and the adjacent front or side surfaces 1, 2 are stiffened by longitudinal weld seams. The longitudinal weld seams extend from the unillustrated bottom weld seam to the top weld seam 6 and are interrupted at the strip fastener 7. Even the second side gusset 4 is bordered by outer edges that are reinforced by longitudinal weld seams. It can be seen in the horizontal cross section of FIG. 3 that the longitudinal weld seam 5 that closes the film bag on its edge is at the second side gusset 4 and connects the second side gusset 4 with the front panel or the back panel 1, 2 of the bag. The longitudinal weld seam 5 serves for sealing, while the other weld seams at the outer edges only reinforce the folds 10 and do not have a sealing function.

Figure 3:
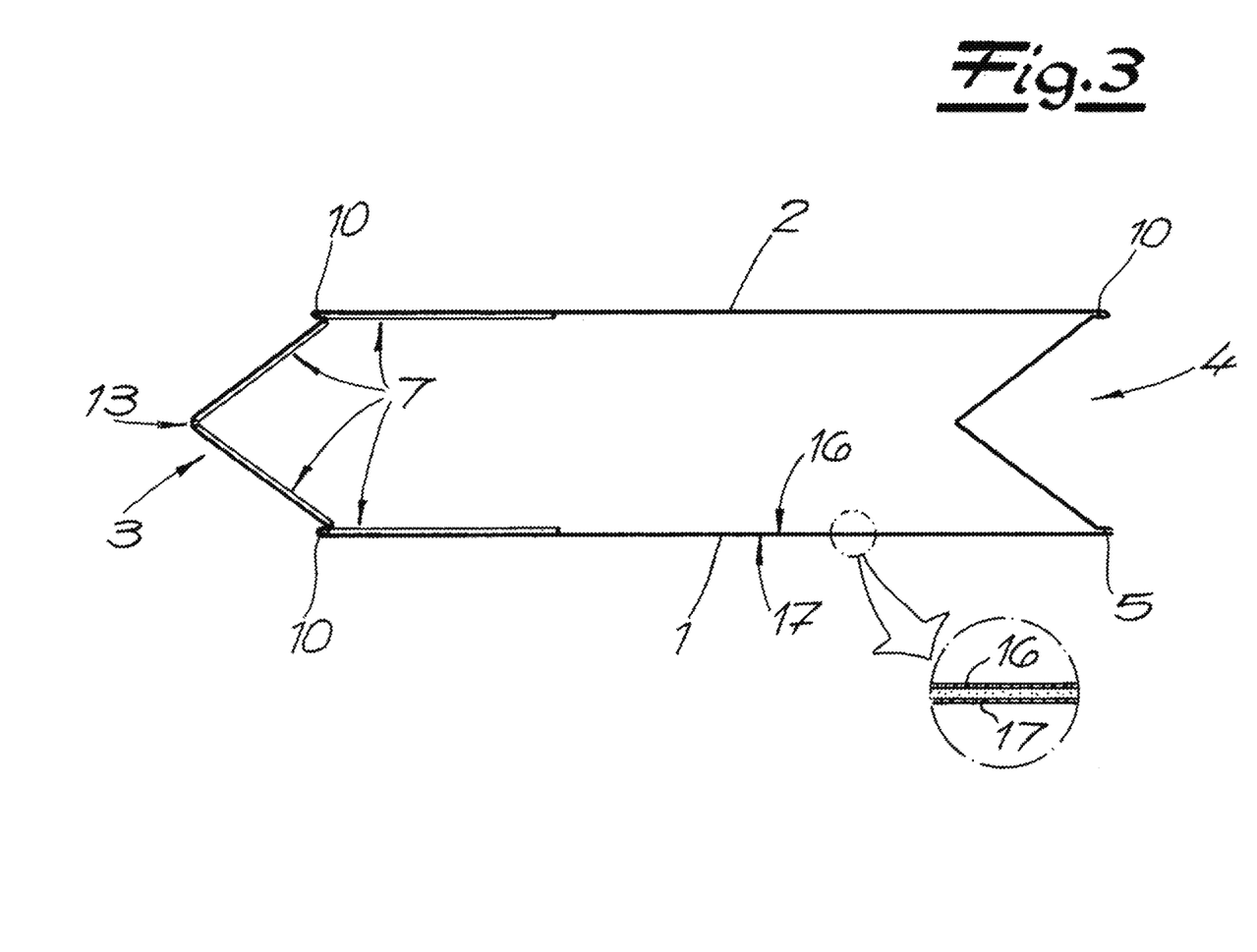

The strip fastener 7 has a attachment lip 11 that is secured to the inner surface of the film packaging bag and locking strips 12 formed on the attachment lip 11 form a zipper and can be snapped into each other upon the application of pressure. At a center fold 13 of the first side gusset 3, the locking strips 12 can be interrupted by a cut-out or a cut. This prevents a spreading of the side gusset sections as a consequence of bending of the attachment lips of the locking strips 12. In addition to the shown continuous self-locking strip fastener 7, the front panel 1, back panel 2, or first side gusset 3 can also have their own strip fasteners that fit together and are separate from each other.

The length of the strip fastener 7 is greater than the width of the first side gusset 3 so that a central portion of the strip fastener 7 is secured to the inner surface of the side gusset 3 and end portions of the strip fastener 7 that are attached to it on both sides are secured to the front panel 1 or the back panel 2 of the bag.

Figure 2:
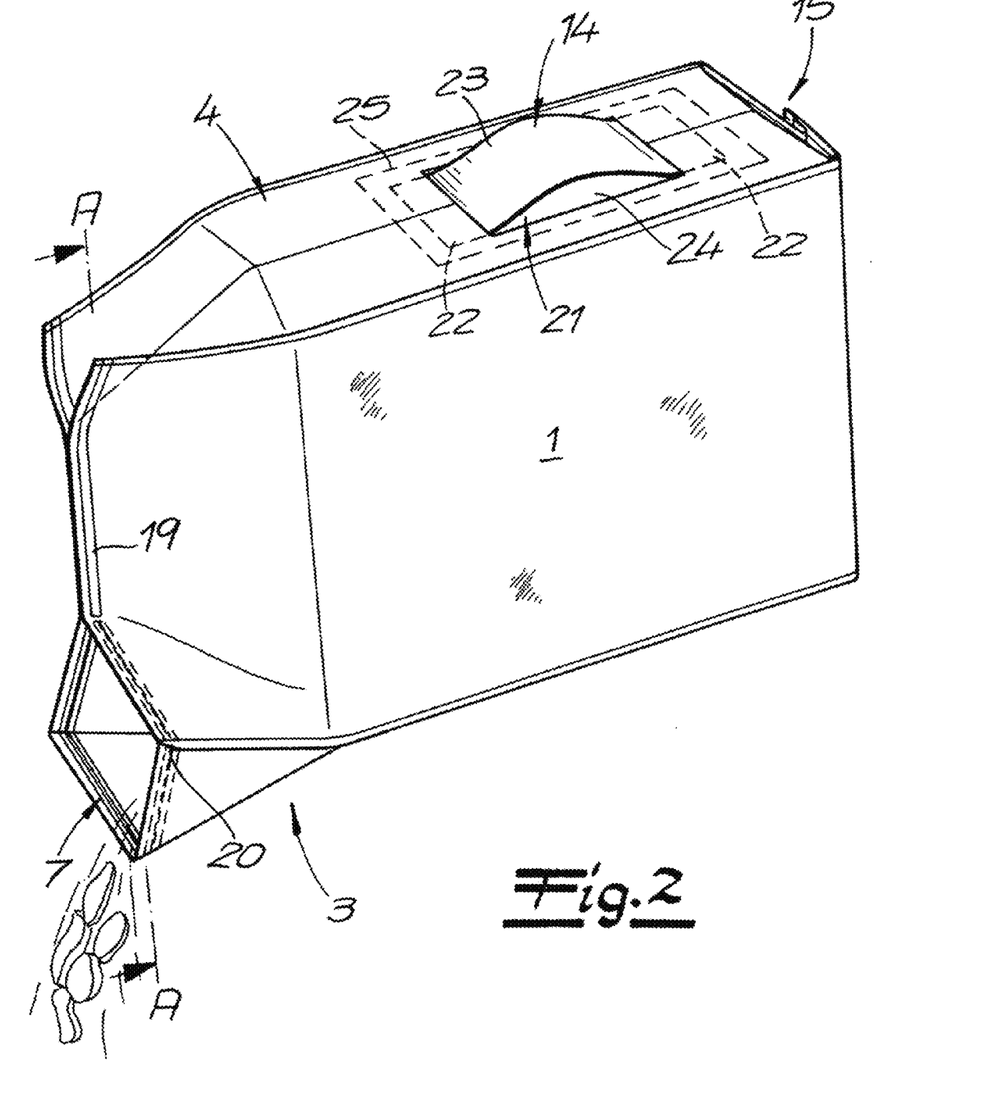

As shown in FIG. 2 a carry handle 14 on the second side gusset 4 makes it easy to pour out of the contents with a slight tipping. The provision of the carry handle 14 on a second side gusset 4 is not mandatory, but it is, however, preferably located centrally or off-center, offset with respect to a bottom 15 of the film packaging bag.

The film from which the film packaging bag is made is a composite film of at least two layers, having a first layer 16 on the inner surface of the bag of a weldable plastic and at the outer surface of the bag, preferably a printed second layer 17 of a material that cannot be welded. As polymer for the first layer 16, polyolefins are especially suitable such as, for example, polyethylene, polypropylene, polyethylene-copolymer, polypropylene-copolymer, as well as mixtures of these polymers. The second layer 17 preferably consists of polyester, biaxially oriented polypropylene (BOPP) or an oriented polyamide (OPA). The materials identified can be printed on the inside and on the outside. The composite film can have one or more intermediate layers, for example, a thin metal layer to form a barrier to oxygen, steam, and aromas. But it is also within the scope of the invention that the film is formed completely by polyethylene, so then film packaging bags can be disposed of particularly easily. The tear line 9 for opening the film packaging bag consists of a combination of an embossed line formed by hot sealing and a laser seam that is formed in an outer layer of the composite film and overlies the embossed line.

Figure 1:
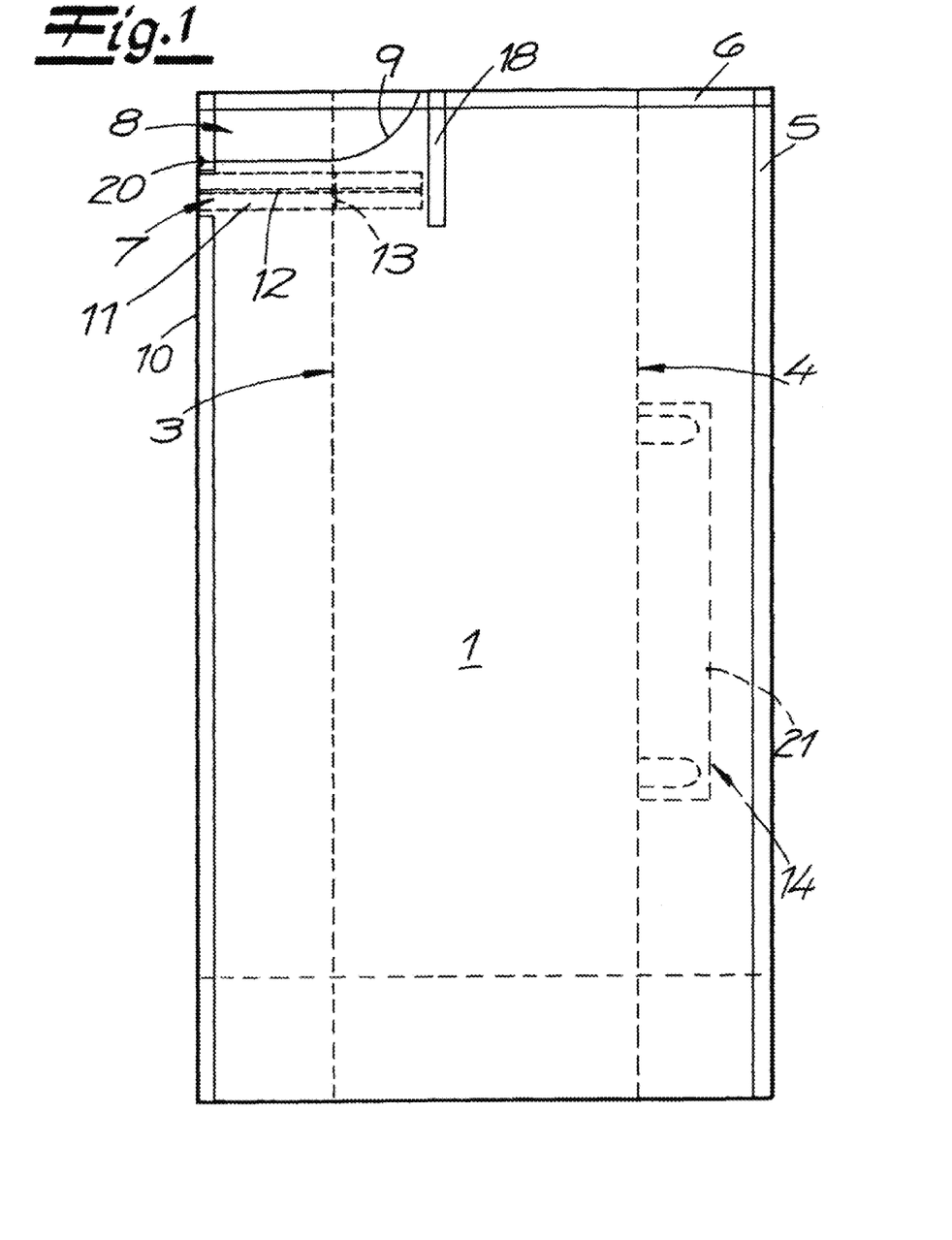
FIG. 1 is a schematic side view of an originally closed film packaging bag with a pour spout and a carry handle, FIG. 2 an alternative embodiment of the film packaging bag in opened condition in a perspective view, FIG. 3 a cross section through the open film packaging bag at a plane A-A of FIG. 2, FIG. 4 a preferred embodiment of the carry handle in a detail view, FIG. 5 a perspective view of an alternative preferred embodiment of the carry handle, FIG. 6 a cross section along line B-B of FIG. 5 with an unopened perforation.

In the example of the embodiment shown in FIG. 1, the tear line 9 extends parallel to the strip fastener 7 and then veers off upward toward the top weld seam 6. The front panel 1 and the back panel 2 of the film bag are connected at a vertical weld seam 18 adjacent the inner ends of the strip fastener 7 and extending up to the top weld seam 6. In the embodiment shown in FIG. 2, the tear line 9 extends parallel to the strip fastener 7 and to a horizontal weld seam 19 that is adjacent it and that closes the filling space at the top over the entire width of the film bag up to the edges of the second side gusset 4. At the point where the tear line 9 reaches the folds 10 that are reinforced by longitudinal weld seams, notches 20 are cut in the longitudinal weld seams for start tears.

For the design of the carry handle 14, various possibilities result lie within the scope of the current invention, which are shown as example in the figures. FIG. 1 shows a particularly simple design in which a separate strip 21 of film is fastened to the outside on the second side gusset 4 by adhesion or hot sealing.

In the embodiment according to FIG. 2, a strip 21 of film is provided as a carry handle 14, and is welded at its ends 22 onto the inner faces of the second side gusset 4, a central handle portion 23 of the strip 21 of film being accessible through an opening 24 in the second side gusset 4. The portion of carry handle 14 is thus covered at the inner bag surface by a piece 25 of film.

Figure 4:
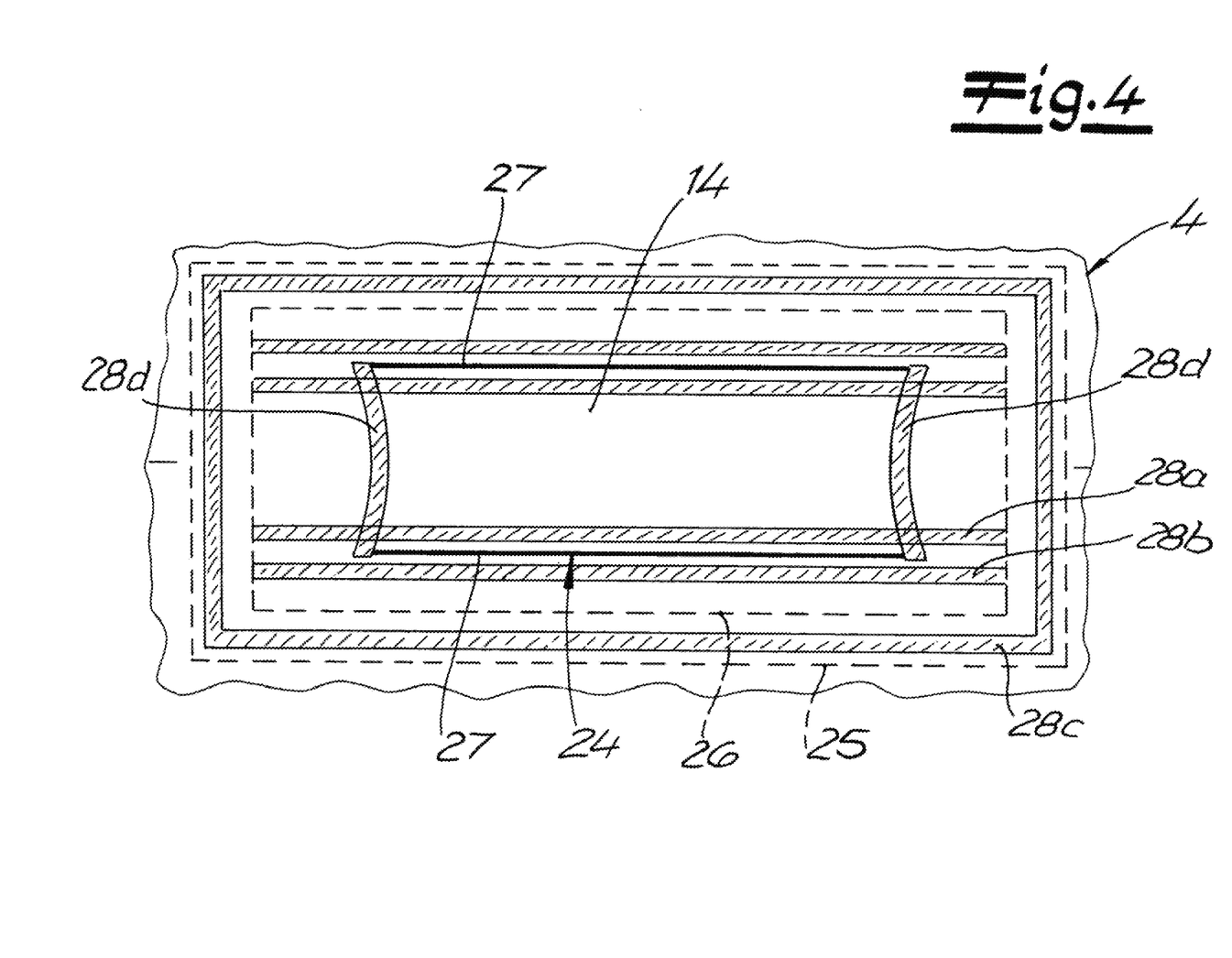

FIG. 4 shows a detail view of an alternative development of the carry handle 14. In the region of the carry handle 14, a reinforcement sheet 26 is fastened to the inner surface of the bag, the carry handle 14 being formed by a piece of the film and the reinforcement sheet 26 that is flanked by two slits 27. The slits 27 each extend between two respective weld seams 28a and 28b that weld the reinforcement sheet 26 onto the inner surface of the film of the bag. As a result of the longitudinally extending weld seams 28a and 28b the film of the bag and the reinforcement sheet 26 are firmly connected in the region of the carry handle 14 and adjacent to the opening 24 that is formed by the carry handle 14, so that an even distribution of the bearing load to the film of the bag and the reinforcement sheet 26 is achieved. The reinforcement sheet 26 is completely covered on the inner surface of the bag by a piece 25 of cover film. The cover-film piece 25 is bonded to the inner surface of the second side gusset 4 by a circumferential closed weld seam 28c that surrounds the reinforcement sheet 26 so that a reliable sealing of the film packaging bag in the region of the carry handle 14 is ensured. To prevent a tearing open of the two slits 27 that extend straight when loaded, weld seams 28d are located extending essentially perpendicular to the slits in the region of the ends of each of the slits 27. The weld seams 28d each extend from one end of one slit 27 to the respective end of the other slit and are arcuate. Because the weld seams 28d extending essentially perpendicular to the slits 27 are curved in toward the carry handle 14, the bearing load is primarily applied to central portions of the weld seams 28*d*, so that the danger of the carry handle 14 being ripped out is significantly reduced.

Figure 5:
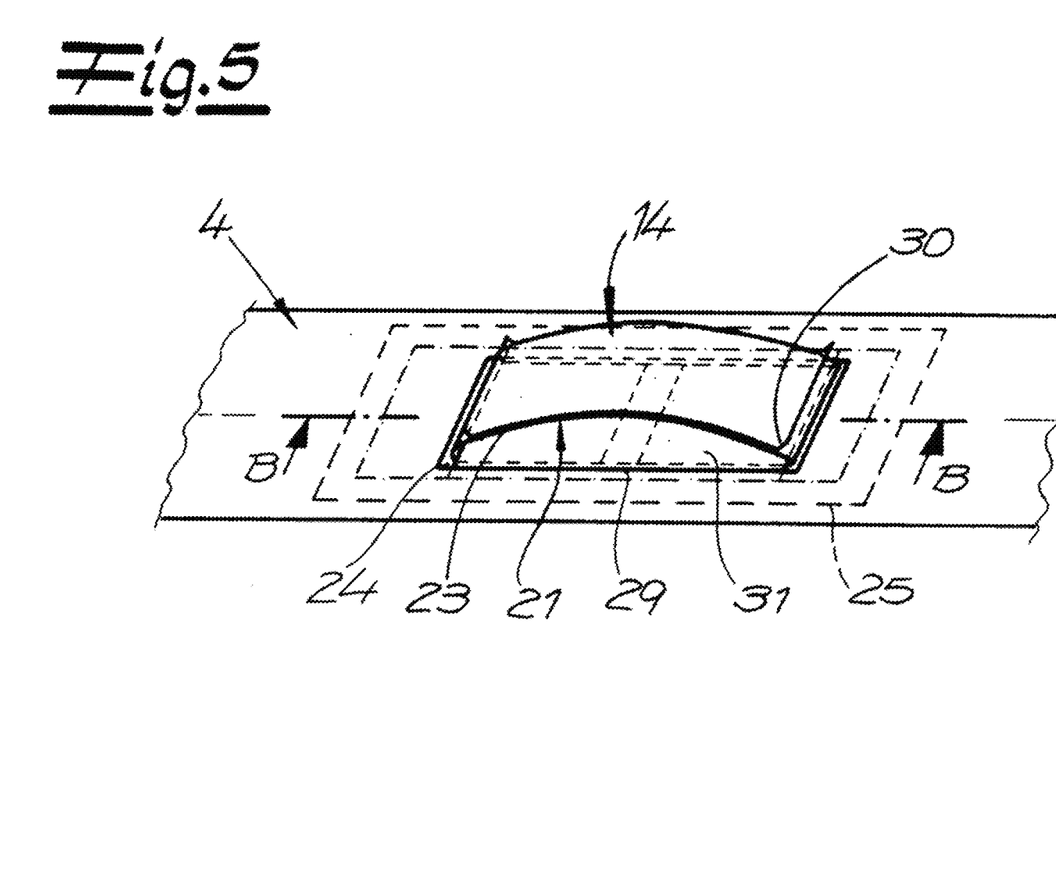
Figure 6:
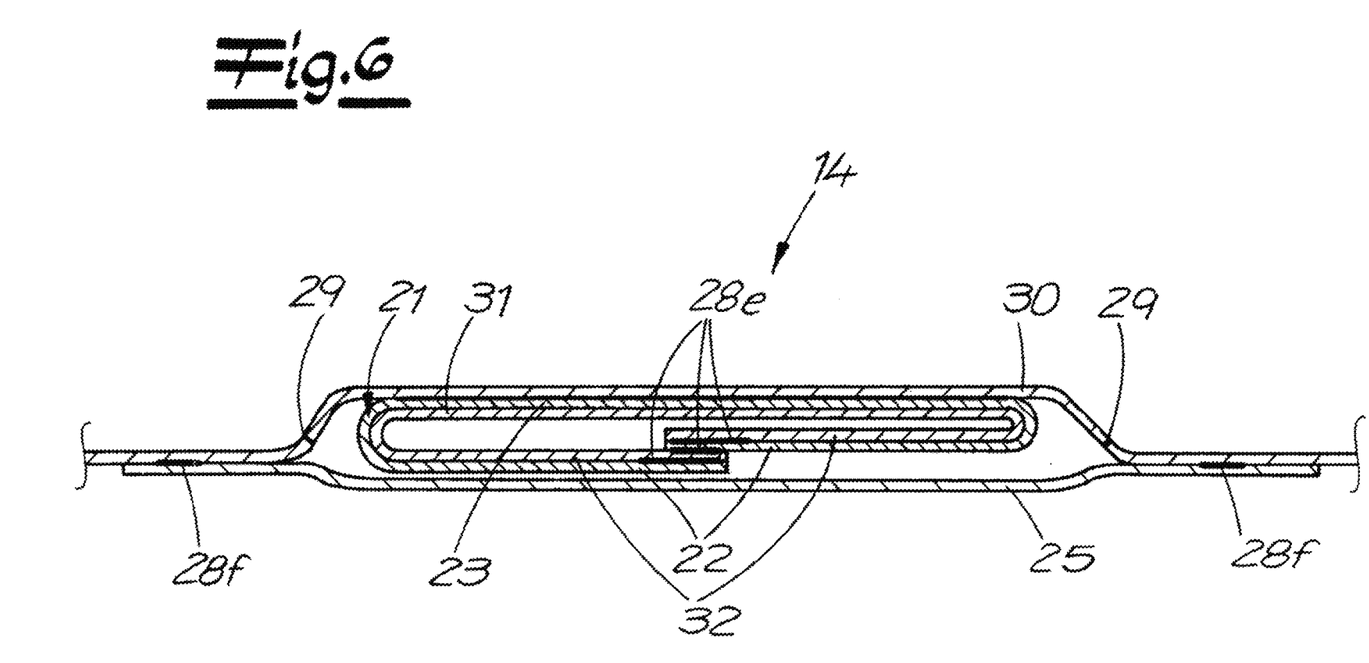

A further embodiment of the carry handle 14 is shown in FIG. 5 and FIG. 6. The carry handle 14 has a strip 21 of film with a handle portion 23, whereby the handle portion 23 is released by the opening of a tear line or perforation 29. The piece of film 30 of the film of the bag that is bordered by the tear line or perforation 29 is connected with the handle portion 23, preferably by hot sealing or adhesion.

FIG. 6 shows a cross section view along the line B-B of FIG. 5, whereby however the perforation 29 or tear line is not yet opened so the handle portion 23 is hidden within the second side gusset 4 of the film packaging bag. The strip 21 of film is provided on a carrier sheet 31 with end portions 32 of the carrier sheet 31 folded with strip ends 22 of the strip 21 of film toward the inner surface of the bag, so that the strip 21 surrounds the carrier sheet 31 with its strip ends 22 attached at both ends to the handle portion 23. The strip ends 22 overlap partially and are on the one hand connected with the end portions 32 of the carrier sheet 31 and on the other hand by a position of the carrier sheet 31 with each other by weld seams 28*e*. The strips 21 of film thereby form a closed loop, as a result of which a very high bearing load of the carry handle 14 is achieved. The carrier sheet 31 and the strip 21 of film are covered on the inner surface of the bag by a piece of cover film 25. When carrying the film packaging bag using the carry handle 14, the weight of the bag is distributed by the strip 21 of film to the carrier sheet 31 so that the carrier sheet 31 is connected directly with the inner surface of the bag or with the piece of cover film 25 to the side of the strip 21 of film. The bearing load is thereby distributed along the weld seams 28*f* that extend longitudinally of the carry handle 14 and the second side gusset 4, so that even for large bearing loads, a ripping out of the carry handle 14 can be is avoided.

The invention claimed is:

1. A bag comprising:
    generally congruent front and back panels of plastic film having upper and lower edges and a pair of side edges extending vertically between the upper and lower edges;
    first and second side gussets of plastic film each extending between one of the side edges of one of the panels and the respective side edge of the other panel and forming folds with the side edges, the first gusset being movable between a folded-in position tucked between the panels and a folded-out position projecting out from between the panels, the front panel, the back panel, and the side gussets being formed by folding of an at least two-layer film to provide at inner surfaces of the panels and gussets a first layer of a weldable plastic and at outer surfaces of the panels and gussets a second layer of a nonweldable material;
    an upper weld extending full width along the upper edges between the side edges and sealing together the upper edges;
    respective longitudinal reinforcement welds that extend along the side edges and folds from the lower edges to the upper weld;
    a reclosable fastener comprising a pair of matable strips secured to the inner surfaces of the panels and of the first side gusset, connecting in a closed position the first side gusset with the front and back panels, and extending horizontally below the upper weld from the side edges of the first side gusset, the longitudinal welds extending continuously between the upper and lower edges except on the side edges of the first side gusset at the reclosable fastener;
    notches formed at the side edge in the folds and in the longitudinal reinforcement welds of the first side gusset between the reclosable fastener and the upper weld;
    a tear line formed in the front and back panels extending from the notches between the reclosable fastener and the upper weld for defining and facilitating removal of a part of the front and back panels and first gusset above the fastener at the first gusset, whereby when the part is removed and the fastener is closed an interior of the bag is sealed and when the part is removed and the fastener is opened the first gusset can be moved from the folded-in to the folded-out position in which it forms a spout and fluent contents of the bag can be poured out of the spout; and
    a handle secured to the second gusset below the slide fastener between the longitudinal reinforcement welds of the second gusset and above the lower edges.

2. The film packaging bag according to claim 1 wherein the second side gusset has two slits, the carry handle being formed by the portion of the film that is bordered by the slits at its edges, the portion of the carry handle being covered by at least one piece of cover film on the inside surface of the bag.

3. The film packaging bag according to claim 2 wherein in the region of the carry handle, a reinforcement sheet is secured to the inner surface of the bag, the carry handle being formed by a piece of film and the reinforcement sheet whose edges are flanked by the slits.

4. The film packaging bag according to claim 1 wherein the carry handle is formed by a strip of film that is fastened directly over a carrier sheet on the inner surface of the second side gusset and that, when used, is accessible through an opening in the second side gusset, the portion of the carry handle being covered at the inner surface of the bag by at least one piece of cover film.

5. The film packaging bag according to claim 4 wherein the strip of film is connected with the inner surface of the bag by a carrier sheet that is wider than the strip of film, the strip of film being provided with a longitudinally central handle portion between two strip ends that are folded around the carrier sheet, the carrier sheet being connected directly or indirectly with the inner surface of the bag laterally of the strip of film.

6. The film packaging bag according to claim 1 wherein the carry handle is on the outer surface of the second side gusset.

7. The film packaging bag according to claim 1 wherein the tear line consists of a combination of an embossed line formed by hot sealing and a laser seam that overlies the embossed line.

8. The film packaging bag according to claim 1 wherein the reclosable fastener is a strip fastener that can be interlocked with itself.

9. The film packaging bag according to claim 8 wherein the strip fastener has locking strips.

10. The film packaging bag according to claim 1 wherein the reclosable fastener is formed by a male strip fastener with at least one projection and a respective female strip fastener with at least one seat for the projection.

11. The film packaging bag according to claim 1 wherein the pour spout formed by the first side gusset can be folded in between the front panel and the back panel to close it.

12. The bag defined in claim 1 wherein the second gusset is formed with a pair of horizontally spaced throughgoing slits flanking a portion of the film of the second gusset defining the handle, the second gusset including a layer of a cover film bonded to an inner surface of the second gusset all around the slits.

13. The bag defined in claim 12 wherein the second gusset is formed adjacent each slit with a longitudinal weld bonding the second gusset to the cover film.

14. The bag defined in claim 1, wherein the bag is formed with a vertical weld extending from an inner end of the fastener to the upper edges and defining the removable part with the fastener.

* * * * *